United States Patent [19]

Phillips et al.

[11] 4,152,274

[45] May 1, 1979

[54] METHOD FOR REDUCING FRICTION LOSS IN A WELL FRACTURING PROCESS

[75] Inventors: Kenneth G. Phillips, River Forest, Ill.; Wood E. Hunter, Memphis, Tenn.

[73] Assignee: Nalco Chemical Company, Oak Brook, Ill.

[21] Appl. No.: 876,296

[22] Filed: Feb. 9, 1978

[51] Int. Cl.$^2$ ................. F17D 1/16; E21B 43/26
[52] U.S. Cl. ..................... 252/8.55 R; 137/13; 166/308
[58] Field of Search ............ 252/8.55 R, 8.55 C, 252/8.55 D, 8.5 C; 137/13; 166/308; 526/307

[56] References Cited

U.S. PATENT DOCUMENTS

| | | | |
|---|---|---|---|
| 2,980,657 | 4/1961 | Melamed | 526/307 |
| 3,014,896 | 12/1961 | Colwell et al. | 526/307 |
| 3,254,719 | 6/1966 | Root | 166/308 |
| 3,868,328 | 2/1975 | Boothe et al. | 252/8.55 |
| 3,943,060 | 3/1976 | Martin et al. | 252/8.55 |
| 4,075,183 | 2/1978 | Kawakami et al. | 526/307 X |

*Primary Examiner*—Herbert B. Guynn
*Attorney, Agent, or Firm*—John G. Premo; Robert A. Miller

[57] ABSTRACT

A method of reducing friction loss in oil well fracturing through the addition of small amounts of copolymers of acrylamide and quaternary salts of dimethylaminoethyl methacrylate and dimethylaminopropyl methacrylamide.

4 Claims, No Drawings

METHOD FOR REDUCING FRICTION LOSS IN A WELL FRACTURING PROCESS

BACKGROUND OF THE INVENTION

This invention relates to the art of reducing energy loss during the flow of fluids through pipes, which by common usage in oil field terminology has become known as "friction reduction." Our invention is particularly directed to friction reduction in brines and fresh water used in fracturing operations. The polymers utilized in our invention operate as effective friction reducers even in the presence of polyvalent cations and/or acids. It may also be useful in firefighting and to reduce energy loss in hydraulic control systems.

In fracturing an earth formation penetrated by a well, an aqueous or other fluid is injected through the well into the earth formation at a high velocity to cause fracturing of the formation. Friction reducing polymers are added to reduce turbulence and consequent energy loss in the flow of the fluid from the surface to the formation.

Polyacrylamide is used as a friction reducing agent perhaps more than other material. See Root, U.S. Pat. No. 3,254,719. However, its versatility is limited. An ideal friction reducing polymer is one which is compatible not only with fresh water but also sodium chloride and calcium chloride brines.

SUMMARY OF THE INVENTION

We have found that water-soluble copolymers of acrylamide and either dimethylaminoethyl methacrylate (DMAEM) quaternary salts or dimethylaminopropyl methacrylamide (DMAPM) quaternary salts are useful as friction reducers in fresh water, in brines containing polyvalent cations, as well as in acidic environments.

The DMAEM copolymers should contain from about 40–95% by weight acrylamide and the remainder DMAEM quaternary salt; preferably, the copolymers comprise 70–85% acrylamide. The DMAPM copolymers should contain 40–95% by weight acrylamide; 70–90% by weight acrylamide is preferred.

The quaternary salts of DMAEM and DMAPM are formed by reacting these molecules with $C_1$–$C_4$ alkyl salts. Preferred alkyl salts include methyl chloride and methyl sulfate. Other useful quaternary agents would include ethyl bromide and propyl chloride.

The molecular weight of the copolymers described above should be at least 100,000. Preferably, the molecular weight will lie in the range 1,000,000–3,000,000. Treatment dosages will be at least 50 ppm by weight. Preferably, the treatment dosage will lie in the range 100–300 ppm.

EXAMPLES

Testing Device

The copolymers of the invention were tested in a laboratory friction reduction device. This device is described in the literature in some detail in an article by G. D. Sulton of Halliburton Services ("Uses and Results of a Liquid Friction Reducer in Acidizing Treatments," *Proceedings of the Annual Southwest Petroleum Short Course*, 23:1976).

Briefly, the device comprises a 3 gallon reservoir from which fluid is pumped through an 8 foot length of ⅜ inch stainless steel tube at a maximum rate of 10 gpm using a Moyno progressive cavity pump. During operation of the device, the pressure drop across a 4 foot section of the ⅜ inch pump is measured using a pressure transducer. The transducer is connected to an x-y recorder.

The 3 gallon reservoir is filled with a base fluid comprising cold tap water either with or without additives. Air is purged from the system and the fluid temperature is recorded. Pumping action is commenced with untreated tap water to establish a 100% friction line on the x-y recorder and then approximately 6 cc of a 28% polymeric solution is injected into the 3 gallon reservoir. Friction reduction measurements are then recorded over a period of 7 minutes.

EXAMPLE 1

Samples of a copolymer acrylamide and a dimethyl sulfate quaternary of DMAEM with varying weight ratios were prepared. The samples were evaluated in the friction reduction test device described earlier with results as reported in Table I.

TABLE I

ACRYLAMIDE-DMAEM . $Me_2SO_4$ COPOLYMERS FOR FRICTION REDUCTION

| % DMAEM | /η/ | % FRICTION REDUCTION | MAXIMUM YIELD TIME* | COMMENTS |
|---|---|---|---|---|
| 25 | — | 76 | — | Room temperature |
| 25 | — | 28 | 72 seconds | 40° F. |
| 25 | — | 66 | 102 seconds | 40° F. 2% NaCl |
| 25 | — | 63 | 210 seconds | 40° F. |
| 10 | — | 66 | 150 seconds | 40° F. |
| 18.7 (MeCl quat) | — | 61 | 550 seconds | 40° F. |
| 25 | 13.1 | 75 | 36 seconds | |
| 12.5 | 14.8 | 70 | 90 seconds | |
| 25 | 9.7 | 68 | 30 seconds | 3% $NaSO_4$ |
| 12.5 | 14.8 | 75 | 30 seconds | 5% $NaSO_4$ |
| 12.5 | 13.8 | 72 | 60 seconds | 40° F. |
| 15 | 11.3 | 72 | 114 seconds | 40° F. |
| 25 | 12.8 | 74 | 54 seconds | 40° F. |

*Maximum yield is measured from the moment of introduction of the friction reducer to the point where maximum friction reduction is obtained.

EXAMPLE 2

Samples of a copolymer of acrylamide and methyl chloride quaternary salts of DMAPM of varying weight ratios were prepared. The samples were then evaluated in the friction test device described earlier with results as reported in Table II.

TABLE II

ACRYLAMIDE-DMAPM MeCl QUAT COPOLYMERS FOR FRICTION REDUCTION

| % DMAPM . MeCl QUAT | % FRICTION REDUCTION | MAXIMUM YIELD TIME |
|---|---|---|
| 25* | 10 | — |
| 15* | 50 | — |
| 5* | 40 | — |
| 30 | 77–73 | 20 seconds |
| 25 | 70–71 | 60 seconds |
| 23 | 72–77 | 120 seconds |
| 20 | 67–77 | 120 seconds |
| 11 | 68–79 | 120 seconds |

*Friction reduction results indicate expected DMAPM.MeCl quat not present (polymer not characterized prior to testing).

We claim:

1. A method of reducing friction loss due to turbulent flow in an aqueous fracturing fluid in an oil field fracturing process comprising adding to said aqueous fracturing fluid a water-soluble copolymer consisting of from about 40–95% by weight acrylamide and the remainder being a quaternary salt of dimethylaminoethyl methacrylate which has been formed by reaction of the dimethylaminoethyl methacrylate monomer with alkyl chloride, bromide or sulfate quaternizing agents containing from 1 to 4 carbon atoms, the copolymer having a molecular weight of at least 100,000.

2. The method of claim 1 wherein the water-soluble copolymer has a molecular weight ranging between 1,000,000 and 3,000,000.

3. In the process of fracturing an earth formation penetrated by a well, wherein an aqueous fracturing fluid is injected through the well into the earth formation at a high velocity to cause fracturing of the formation, the improvement of decreasing the friction loss in the flow of the aqueous fracturing fluid which comprises adding to the fracturing fluid prior to injection at least 50 parts per million by weight of a water-soluble copolymer consisting of from about 40–95% by weight acrylamide and the remainder being a quaternary salt of dimethylaminoethyl methacrylate which has been formed by reaction of the dimethylaminoethyl methacrylate monomer with alkyl chloride, bromide or sulfate quaternizing agents containing from 1 to 4 carbon atoms, the copolymer having a molecular weight of at least 100,000.

4. The method of claim 3 wherein the water-soluble copolymer has a molecular weight ranging between 1,000,000 and 3,000,000.

* * * * *